United States Patent [19]

Tsurunaga et al.

[11] 4,378,041
[45] Mar. 29, 1983

[54] PNEUMATIC BIAS TIRES FOR OFF-ROAD VEHICLES

[75] Inventors: Yasuaki Tsurunaga, Kodaira; Shinji Usui, Higashimurayama, both of Japan

[73] Assignee: Bridgestone Tire Co., Ltd., Tokyo, Japan

[21] Appl. No.: 216,897

[22] Filed: Dec. 16, 1980

[30] Foreign Application Priority Data

Dec. 29, 1979 [JP] Japan .................. 54-182390

[51] Int. Cl.³ ............................... B60C 9/00
[52] U.S. Cl. ................... 152/356 R; 156/133; 428/295
[58] Field of Search ............... 152/356 R, 355, 356 A, 152/354 R; 156/123 R, 133; 428/292, 295

[56] References Cited

U.S. PATENT DOCUMENTS

| | | | |
|---|---|---|---|
| 2,225,042 | 12/1940 | Elliott | 152/356 R |
| 2,432,630 | 12/1947 | Puroy | 152/356 R |
| 3,160,192 | 12/1964 | Drew | 152/356 R X |
| 3,345,228 | 10/1967 | Kovac et al. | 152/356 R X |
| 3,672,423 | 6/1972 | Duduk | 152/356 R |

Primary Examiner—William A. Powell
Assistant Examiner—Thomas Bokan
Attorney, Agent, or Firm—Sughrue, Mion, Zinn, Macpeak and Seas

[57] ABSTRACT

A pneumatic bias tire for off-road vehicles is disclosed. This tire comprises a bias-structured carcass composed of plural plies each containing organic fiber cords embedded in rubber. In the carcass, the inner plies located near the inner surface of the tire have a rubberized cord arrangement of a more slackened state as compared with the outer plies and further medium plies existent between the inner and outer plies.

2 Claims, 6 Drawing Figures

PNEUMATIC BIAS TIRES FOR OFF-ROAD VEHICLES

BACKGROUND OF THE INVENTION

This invention relates to pneumatic bias tires for off-road vehicles, and more particularly to an improvement of the bias-structured carcass composed of plural plies each containing organic fiber cords embedded in rubber in the tires of this type used under heavy load. The tires of the invention are mainly used for large size trucks, construction vehicles, industrial vehicles and the like, which travel on rough road or on road at least one part of which is inclusive of an off-road area.

The above type tires, i.e. tires having a bias-structured carcass composed of plural plies each containing organic fiber cords embedded in rubber having many merits, but also have some demerits. Particularly, a significant problem is that the number of plies constituting the carcass (hereinafter referred to as carcass ply) is increased for imparting a desirable strength matching with use conditions to the tire, which will concretely be described below. For instance, a rubberized ply composed of nylon cord of 1890 denier/two strands is mainly used at present as a carcass. When such a rubberized ply is applied to the tire for the large size truck, construction vehicle, industrial vehicle or the like, the number of carcass plies is generally 10–20 plies, while in case of the tire for superlarge size truck, the number of carcass plies frequently exceeds 40 plies. However, even when using such a large number of plies, if the conditions of use such as the running on a rough road and the like become severer, cut failure and burst failure are frequently caused.

Burst failure is roughly classified into a cut burst resulting in burst through the cut failure and a shock burst not passing through the cut failure. In general, the cut failure and cut burst are generated when the tire rides on sharp rocks, while the shock burst is generated when the tire rides on relatively obtuse rocks.

That is, as exaggeratively shown in FIG. 1, when a tire 1 rides on sharp rocks 3 projecting from a surface of a road 2, a large tensile strain T is produced in an inner surface portion 4 of the tire 1 due to the deformation thereof. When the rock 3 is relatively obtuse, if the tensile strain produced in the inner surface portion 4 exceeds a certain value, rupture starts from the cords of the carcass ply facing the inner surface of the tire at that inner surface portion and finally burst is caused together with the action of internal pressure, resulting in a shock burst. When the rock is sharp, the tensile strain T is also produced in the inner surface portion 4 of the tire 1, but a larger strain is produced in an outer surface portion 5 of the tire around the pointed end of the rock. This results in the rupture of tire beginning from the pointed end of the rock 3 or the cut failure and hence the cut burst.

In order to improve the strength of the carcass for the prevention of cut failure and burst failure, there have hitherto been proposed, a method of further increasing the number of carcass plies, a method of increasing the strength per cord and the like. However, these methods are not favorable in view of the production cost because the quantity of cords used increases considerably.

SUMMARY OF INVENTION

It is, therefore, an object of the invention to eliminate the above mentioned drawbacks of the prior art and to substantially increase the strength of the carcass against cut failure and burst failure without increasing the number of cords used in the carcass ply or without increasing the production cost.

According to the invention, there is the provision of a pneumatic bias tire for off-road vehicles comprising a bias-structured carcass toroidally extending between a pair of bead portions through a crown of a tread portion inside the tread portion, the carcass being composed of plural plies each containing organic fiber cords embedded in rubber and arranged so that the cords of approximately one half of said carcass plies are crossed with the cords of the remaining carcass plies with respect to the meridional line of the tire. The improvement comprises inner plies of the carcass have a rubberized cord arrangement of a more slackened state as compared with outer plies of said carcass and further medium plies existent between said inner and outer plies of said carcass.

The tires according to the invention are characteristic of a carcass structure capable of advantageously withstanding strong and high rocks and stones because the tensile strain produced in the carcass plies at the inner surface of the tire is small even when the tire rides on such rocks and stones.

BRIEF DESCRIPTION OF DRAWINGS

The invention will now be described in greater detail with reference to the accompanying drawings, wherein.

DESCRIPTION OF THE PREFERRED EMBODIMENT

Figure 1:
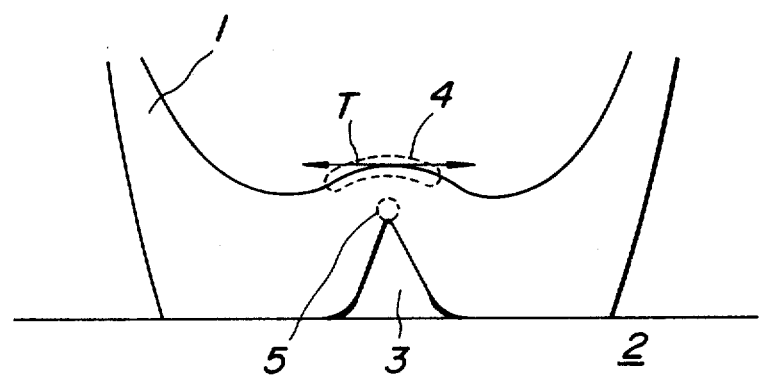
FIG. 1 is a schematically sectional view illustrating a deformation state of a tire when the tire rides on rocks and stones.
Figure 2:
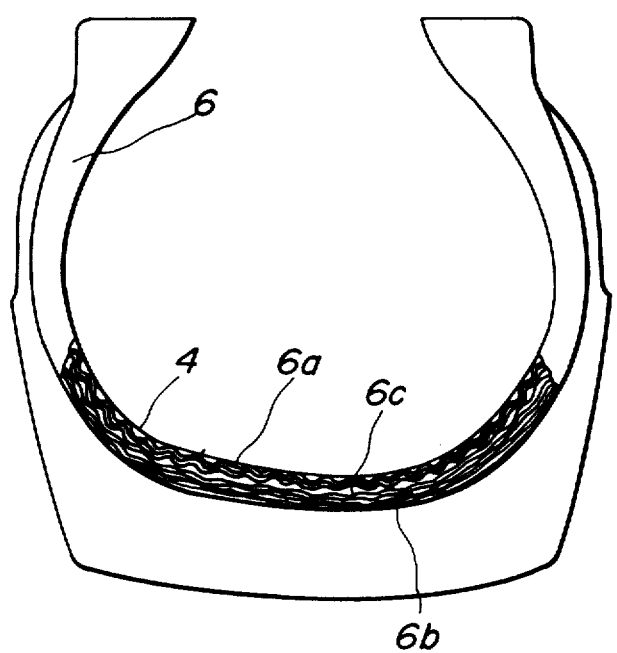
FIG. 2 is a semi-diagrammatical sectional view showing cord arrangements of carcass plies in the tire according to the invention.

As shown in FIG. 2, the tire 1 according to the invention comprises a bias-structured carcass 6 composed of plural plies each containing organic fiber cords embedded in rubber, wherein inner plies 6a have a cord arrangement of a more slackened state as compared with outer plies 6b and medium plies 6c existent between the inner and outer plies. Thus, an elongation larger than the tensile strain usually producing an elongation at rupture is permitted at an inner surface 4 of the tire 1 by the slackened cord arrangement. This means that the inner surface of the tire can withstand riding on high rocks and stones producing a deformation larger than the conventional one.

Although there are considered some methods for embedding cords to be located near the inner surface 4 of the tire in rubber at a more slackened state, the inventors have found from various experimental results that the following method is most simple and advantageous in practice.

This is, the carcass ply cords are arranged before vulcanization of tire so that an angle between the cords of the carcass ply and the circumferential line of the tire (hereinafter referred to as a cord angle) gradually decreases from the inner ply of the carcass 6 toward the outer ply thereof. Particularly, when the number of carcass plies is p, the cords are so arranged that the difference between the cord angle of the inner ply and the cord angle of the outer ply is $(4+0.1p) \sim (4+0.3p)°$.

Now, the cord angle of the inner ply indicates an arithmetical mean value of cord angles between the innermost ply and the adjoining ply in the carcass plies when p is $8 \leq p \leq 14$, or an arithmetical mean value of cord angles from the innermost ply up to the fourth ply extending outward therefrom when p is $p \geq 16$. Similarly, the cord angle of the outer ply indicates an arithmetical mean value of cord angles between the outermost ply and the adjoining ply in the carcass plies when p is $8 \leq p \leq 14$, of an arithmetical mean value of cord angles from the outermost ply up to the fourth ply extending inward therefrom when p is $p \geq 16$.

The reason why the cord angle of the inner ply and the cord angle of the outer ply are defined by the above mentioned arithmetical mean values is due to the fact that the variation in the cord angle is large in the actual tire.

In the pneumatic bias tire for off-road vehicles as mentioned above, the number of plies constituting the carcass is normally not less than 8 plies and even-numbered.

In general, the bias tire is subjected to a toroidal deformation when a green tire prior to vulcanization is molded by vulcanization into a product tire. In other words, the cord angle becomes smaller as the outer diameter of the tire increases and as a result, the meridional component in the cord length becomes smaller. That is, when comparing two green tires having the same tire size but containing the carcass ply with a different cord angle, the rate of change in the meridional component of the cord length after the toroidal deformation is large in the tire having a large cord angle, while such a rate is small in the tire having a small cord angle. Now, when the two carcass plies having different cord angles are arranged in the same green tire, the carcass ply having a large cord angle is forcedly given to meridional change equal to the rate of change in the meridional component of the cord length for the carcass ply having a small cord angle during the toroidal deformation and as a result, the cords of the carcass ply having the large cord angle become slackened.

That is, when the green tire contains plural carcass plies having a different cord angle, apparent cord length of the ply having a larger cord angle is shortened from the original length thereof after the toroidal deformation though there is no difference in the true cord length between the green tire and the product tire, and this tendency increases as the cord angle becomes larger. This fact means that the cords of the ply having a larger cord angle are slackened during the toroidal deformation of the green tire containing plural carcass plies therein. Therefore, the inventors have determined that cords of the inner plies 6a for the carcass 6 are advantageously embedded in rubber at a more slackened state by utilizing the above mentioned phenomenon.

Figure 3A:
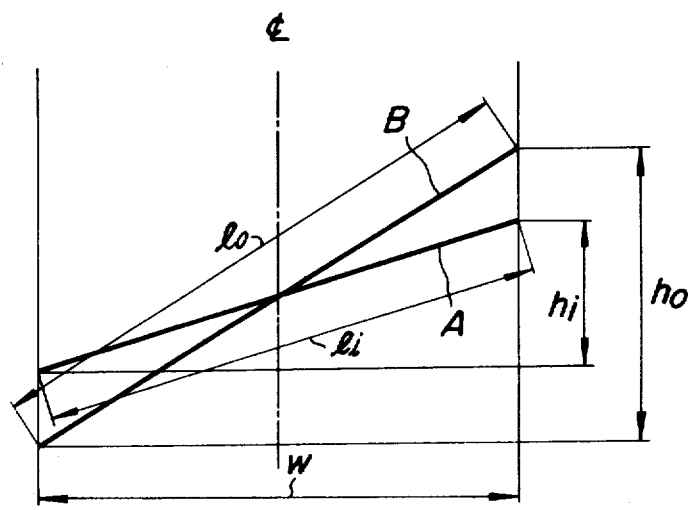
FIGS. 3a and 3b are diagrammatic views showing cord positions of carcass plies in a green tire and a product tire according to the invention, respectively.
Figure 3B:
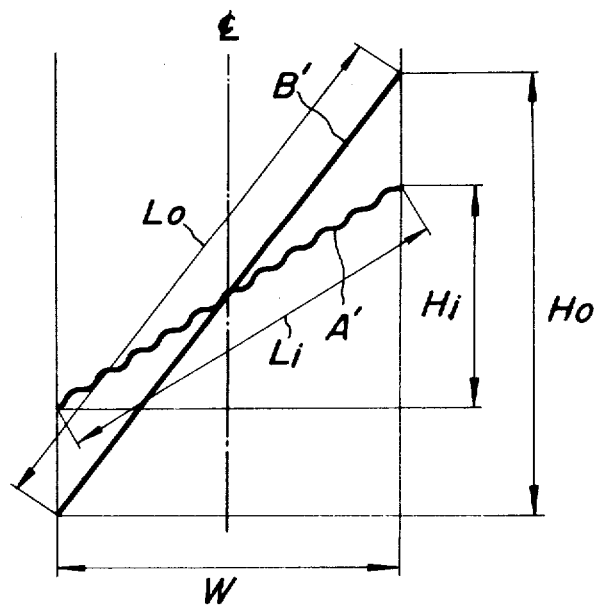

In FIGS. 3a and 3b are typically shown the states of cords A, A' for inner ply and cords B, B' for outer ply in green tire and product tire, respectively, wherein the states of cords A and B change into the states of cords A' and B' in accordance with the toroidal deformation. As shown in FIGS. 3a and 3b, the meridional component of ply cord length as measured perpendicular to a crown center CL of a tread portion varies from w in the green tire to W in the product tire, during which the length of the inner ply cord is slackened from $l_i$ in the green tire to $L_i$ in the product tire but the length of the outer ply cord ($l_o$, $L_o$) is substantially unchanged. Moreover, equatorial components in the cord lengths of cords A, A', B, B' are defined by $h_i$, $H_i$, $h_o$, and $H_o$, respectively.

In the toroidal deformation of from the green tire to the product tire, i.e. in the stage of lengthening the outer periphery of the tire, the angular change is produced in the ply cords as shown in FIGS. 3a and 3b. In this case, the rate of lengthening the equatorial component of the cord length is the same between the inner ply and the outer ply and is equal to a ratio in outer periphery of the product tire to the green tire. That is, there are established the following relationships $H_i/h_i = H_o/h_o$, $H_i > h_i$ and $H_o > h_o$. In this stage, however, the meridional component of the cord length is inversely shortened as in $W < w$.

As a result of the above toroidal deformation, the cord length of the outer ply is substantially unchanged as in $L_o \cong l_o$, but the cords of the inner ply having a large cord angle apparently shortens from $l_i$ to $L_i$ in the product tire, i.e. the latter cords are arranged in rubber near the inner surface of the tire at such a state that they are slackened only by the remainder of $l_i - L_i$.

In practice, the cord angle of the large size bias tire is about 55°–65° to the circumferential line in case of the green tire and about 31°–43° in case of the product tire. From this connection, the difference between the cord angles of the inner ply and the outer ply in the green tire should usually be taken within a range of $(2+0.05p) \sim (2.7+0.2p)°$ in order to achieve the cord angle difference in the product tire of $(4+0.1p) \sim (4+0.3p)°$.

The reason why the cord angle difference in the product tire is limited to a range of $(4+0.1p) \sim (4+0.3p)°$ is based on the following.

When the cord angle difference is below the lower limit of $(4+0.1p)°$, the cords of the inner ply are not changed into the slackened state, and under certain circumstances the cords of the outer ply are inversely slackened to render the cords of the inner ply into a tensioned state. This is due to the following facts.

That is, there is generally a little difference in the meridional component w, W of the cord length between the inner part of the tire and the outer part thereof, which is ignored in FIGS. 3a and 3b. However, when the meridional lengths of the inner and outer ply cords in the green tire are $w_i$ and $w_o$ and the meridional lengths of the inner and outer ply cords in the product tire are $W_i$ and $W_o$, there are usually established the following relationships $W_i/w_i > W_o/w_o$, $W_i < w_i$ and $W_o < w_o$. Since the shortening rate of meridional component in the cord length is larger in the outer part of the tire than in the inner part thereof, if there is little difference in the cord angle between the inner ply and the outer ply, the cords of the outer ply are slackened. However, when the cord angle difference becomes larger to a certain extent, the influence by such a cord angle difference as previously mentioned becomes higher, while the influence by the meridional component difference as mentioned above is ignored.

When the cord angle difference exceeds the upper limit of $(4+0.3p)°$, the cords of the inner ply are excessively slackened, which is apt to cause a peeling phenomenon between the plies or a so-called separation failure. Also, the tension born by the inner and outer plies becomes unbalanced at a normal state of tire without riding on rocks.

Thus, the invention makes it possible to substantially improve the strength of the carcass against the cut and burst failures without increasing the quantity of cords used.

The following examples are given in illustration of the invention and are not intended as limitations thereof.

Typical examples of the pneumatic bias tire according to the invention are shown in the following Table 1. In this table, 1890 d/2 and 1260 d/2 in the column "Cord to be used" indicate nylon cord of 1890 denier/two strands and nylon cord of 1260 denier/two strands, respectively, and the cord angle in the column "Medium plies" indicates an arithmetical mean value of cord angles in the medium two plies when the number of carcass plies is 8–14 plies (e.g. sixth and seventh plies when the number of carcass plies is 12 plies), or an arithmetical mean value of cord angles in the medium four plies when the number of carcass plies is not less than 16 plies (e.g. ninth to twelfth plies when the number of carcass plies is 20 plies). The cord angles are with respect to the meridional line of the tire, it being understood that angles to the circumferential line are the complement of those set forth.

TABLE 1

| Tire size | Cord to be used | Number of carcass plies | Cord angle | | |
|---|---|---|---|---|---|
| | | | Inner plies | Medium plies | Outer plies |
| 18.00–33 | 1890 d/2 | 18 | 46 | 50 | 54 |
| | 1260 d/2 | 24 | 46 | 50 | 54 |
| 21.00–35 | 1890 d/2 | 20 | 49 | 55 | 59 |
| | 1260 d/2 | 26 | 49 | 55 | 59 |
| 24.00–49 | 1890 d/2 | 24 | 50 | 55 | 60 |
| | 1260 d/2 | 32 | 50 | 55 | 60 |
| 29.50–29 | 1890 d/2 | 12 | 51 | 55 | 58 |
| | 1260 d/2 | 16 | 51 | 55 | 58 |
| 30.00–51 | 1890 d/2 | 32 | 49 | 55 | 61 |
| | 1260 d/2 | 42 | 49 | 55 | 61 |
| 33.25–35 | 1890 d/2 | 18 | 51 | 55 | 59 |
| | 1260 d/2 | 24 | 51 | 55 | 59 |
| 36.00–51 | 1890 d/2 | 40 | 48 | 55 | 62 |
| | 1260 d/2 | 52 | 48 | 55 | 62 |

Figure 4A:
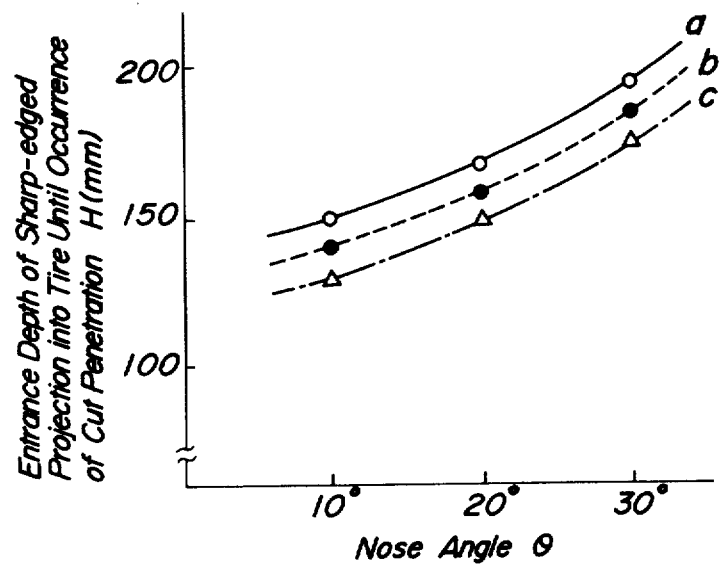
FIG. 4a is a graph showing results of tires subjected to cut penetration test.
Figure 4B:
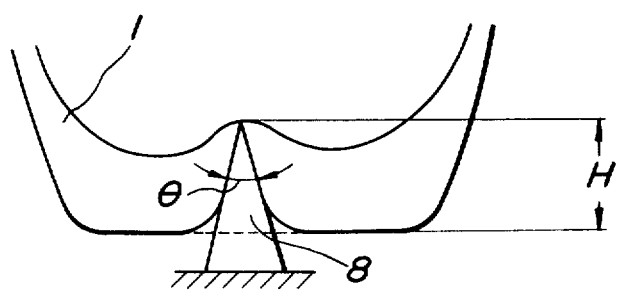
FIG. 4b is a schematic representation for performing the cut penetration test.

FIG. 4a is a graph showing the effects of the invention, wherein an abscissa represents a nose angle $\theta$ of a sharp-edged projection and an ordinate represents an entrance depth H of the sharp-edged projection into the tire until the occurrence of cut penetration. The results of FIG. 4a are obtained by the cut penetration test wherein the sharp-edged projection 8 enters into the tire 1 until the occurrence of cut penetration as shown in FIG. 4b, which shows that the higher the entrance depth H of the sharp-edged projection, the higher the durability of the tire against the strong and high rocks and stones. The tire to be tested has a tire size of 21.00–35, 1890 d/2, 20 PR. In FIG. 4a, a solid line curve a is the tire according to the invention wherein the cords of the inner plies are embedded in rubber at the slackened state, a dotted lines curve b is the conventional tire wherein the cords of the inner plies are not slackened under no load or have approximately zero of an initial tension, and a dot-dash lines curve c is the conventional tire wherein the cords of the inner plies are embedded in rubber at the tensioned state under no load.

As apparent from the results of FIG. 4a, the tire according to the invention can withstand the highest rocks and stones because the cords of the inner plies in the tire are embedded in rubber at the slackened state.

What is claimed is:

1. In a pneumatic bias tire for off-road vehicles having a bias-structured carcass toroidally extending between a pair of bead portions through a crown of a tread portion inside the tread portion, said carcass being composed of plural plies of the same material, each ply containing organic fiber cords embedded in rubber and arranged so that the cords of approximately one half of said carcass plies are crossed with the cords of the remaining carcass plies with respect to the meridional line of the tire, the improvement comprising; inner plies of said carcass have a rubberized cord arrangement of a more slackened state as compared with outer plies of said carcass and, medium plies between said inner and outer plies of said carcass, said inner plies arranged so that an angle between the cord of each ply constituting said carcass and the circumferential line of the tire is larger in said inner plies than in said outer plies and said medium plies and, wherein when the number p of said carcass plies is an even number of not less than 16 plies, the difference between an arithmetical mean value of cord angles from the innermost ply to the fourth ply extending outward therefrom in said carcass and an arithmetical mean value of cord angles from the outermost ply to the fourth ply extending inward therefrom in said carcass with respect to the meridional line of the tire is $(4+0.1p)\sim(4+0.3p)°$.

2. In a pneumatic bias tire for off-road vehicles having a bias-structured carcass toroidally extending between a pair of bead portions through a crown of a tread portion inside the tread portion, said carcass being composed of plural plies of the same material, each ply containing organic fiber cords embedded in rubber and arranged so that the cords of approximately one half of said carcass plies are crossed with the cords of the remaining carcass plies with respect to the meridional line of the tire, the improvement comprising; inner plies of said carcass have a rubberized cord arrangement of a more slackened state as compared with outer plies of said carcass and, medium plies between said inner and outer plies of said carcass said inner plies arranged so that an angle between the cord of each ply constituting said carcass and the circumferential line of the tire is larger in said inner plies than in said outer plies and said medium plies and, wherein when the number p of said carcass plies is an even number of 8–14 plies, the difference between an arithmetical mean value of cord angles between the innermost ply and the adjoining ply in said carcass and an arithmetical mean value of cord angles between the outermost ply and the adjoining ply in said carcass with respect to the meridional line of the tire is $(4+0.1p)\sim(4+0.3p)°$.

* * * * *